United States Patent

Harth et al.

[15] 3,689,638
[45] Sept. 5, 1972

[54] DENTAL PREPARATIONS CONTAINING OROTIC ACID

[72] Inventors: Helmut Harth, Mainz; Karl Rau, Wiesbaden-Sonnenberg; Helmar R. Wagner, Im Erlich, all of Germany

[73] Assignee: Blendax-Werke R. Schneider & Co., Mainz, Germany

[22] Filed: May 12, 1970

[21] Appl. No.: 36,677

[30] Foreign Application Priority Data

May 29, 1969  Germany..........P 19 27 425.0

[52] U.S. Cl. ..................................................424/54
[51] Int. Cl. ............................................A61k 7/16
[58] Field of Search ....................424/49, 54; 167/93

[56] References Cited

OTHER PUBLICATIONS

Hamann, Drug and Cosmetic Industry, Vol. 68, pp. 174, 175 and 249–253, Feb. 1951
Eichel et al., Science, Vol. 166, pp. 1424–1428, Dec. 1969
Chemical Abstracts (1), Vol. 59, entry 14222c, 1963
Chemical Abstracts (2), Vol. 67, entry 1943c, 1967

*Primary Examiner*—Richard L. Ruff
*Attorney*—Arthur G. Connolly and Rudolf E. Hutz

[57] ABSTRACT

A dental preparation for the care of the mouth which exerts a refreshing and stimulating action on the mucous membranes of the mouth and the gum contains uracil-4-carboxylic acid and/or its inorganic and organic salts, optionally with a solubilizer.

3 Claims, No Drawings

DENTAL PREPARATIONS CONTAINING OROTIC ACID

This invention is related to dental preparations for the care of the mouth, such as mouth washes, toothpastes, tooth powders, chewing gum, teeth-cleaning and chewing tablets or dragees, which exert a refreshing and stimulating action on the mucus membranes of the mouth and on the gum.

Uracil-4-carboxylic acid or 2,6-dioxo-1,2,3,6-tetrahydropyrimidine-4-carboxylic acid, also known by the trivial name orotic acid, is used as an anticholesterinaemic agent, liver-therapeutic agent and anti-arthritic agent in pharmacy. The present invention provides a material for the care of the mouth, containing uracil-4-carboxylic acid and/or one or more salts thereof together with one or more conventional constituents of mouth preparations as hereinafter defined.

The invention is based on the observation that uracil-4-carboxylic acid exerts a vessel-activating blood perfusion-promoting action on the gum and is therefore excellently suited for use in materials for the care of the mouth.

When the material for the care of the mouth is present in aqueous medium, a solubilizing agent for uracil-4-carboxylic acid, such as one or more aminoacids, especially glycine and/or lysine or methylglucamine may also be present with adventage.

If it is desired that the materials for the care of the mouth shall have an additional caries-prophylactic action, the incorporation of one or more of numerous fluorine compounds is advisable, such as for example sodium fluoride, potassium fluoride, ammonium fluoride, lithium fluoride, aluminum fluoride, magnesium fluoride, palladium fluoride, zirconium fluoride, tin fluoride, iron fluoride, alkali fluorozirconates, tin fluorozirconate, fluorostannites, fluoroborates or alkali monofluorophosphates. Organic fluorine compounds such as amine hydrofluorides may also be present. Mixtures of the different fluorine compounds may be used. Furthermore, agents which dissolve dental tartar and remove dental fur, such as complex-forming agents, for example ethylene diaminotetraacetic acid and its alkali salts, or various water-soluble polyphosphonic acid compounds, such as for example 1-hydroxyethylidene- or 1-hydroxypropylidene-disphosphonic acid, and also enzymes, especially carbohydrases such as amylases, dextranases, lysozyme, and proteases, such as pepsin, trypsin, chymotrypsin, papaine, bromeline, and bacterial or fungal proteases, lipases and mixtures of such enzymes, such as are present for example in pancreatin, may also be used in the preparations for the care of the mouth, according to the invention.

These preparations may additionally contain various vitamins, for example of the vitamin B6– or B12–complex, and also antibiotics and other bactericidally active substances, and preservatives. By way of example, there may be mentioned various phenols, such as hexachlorophene, or the lower esters of p-hydroxybenzoic acid and the various quaternary ammonium compounds.

If the dental preparations according to the invention are to be in the form of toothpastes or tooth powders, the incorporation of polishing substances and optionally of fillers is appropriate. Substances which serve this purpose are, for example, dicalcium phosphate and/or its dihydrate, calcium carbonate, insoluble alkali metaphosphate, tricalcium phosphate, calcium pyrophosphate, aluminum oxide and its trihydrate, kaolin, silicon dioxide of various particle sizes, zirconium and aluminum silicate, pulverulent plastics, such as melamime-formaldehyde or urea-formaldehyde resins, polymethyl methacrylate, polyamide powders and polyvinyl chloride, and also mixtures of these substances.

Carboxymethylcellulose, alginates, tragacanth, polyacrylic acid and its alkali salts, polyvinylpyrrolidone and various vegetable mucilages are used as binders and thickeners in toothpastes. Moisturizing agents include, for example, glycerol, sorbitol and other sugar alcohols, and also various aliphatic alkanediols.

In addition to the aroma substances and flavoring substances which are customary in dental preparations and materials for the care of the mouth, it is possible, where required, also to incorporate dyestuffs, optical brighteners and small amounts of solvents, such as aliphatic alcohols or chloroform, astringent agents which further intensify the agreeable action of uracil-4-carboxylic acid on the gum, such as aluminum salts, for example aluminum lactate, or zinc salts in low concentrations.

It is also possible to incorporate various surface-active substances as wetting agents and foaming agents in the dental preparations according to the invention. As such agents there may be mentioned anionic substances such as fatty alcohol sulphates, alkylarylsulphonates, olefin sulphonates and fatty acid-protein condensates, cationic substances such as quaternary ammonium compounds, non-ionic substances such as ethylene oxide and propylene oxide condensates with alcohols and amines or amine oxides, and also amphoteric surface-active substances such as betaines or long-chain alkylamino-carboxylic acids. It is also possible to use mixtures of such substances.

The uracil-4-carboxylic acid (orotic acid) to be used according to the invention in materials for the care of the mouth, and its organic or inorganic salts, are available as commercial products. Uracil-4-carboxylic acid is present in cow's milk and can also be obtained by fermentation of various micro-organisms, and also synthetically. The proportion of uracil-4-carboxylic acid in the materials for the care of the mouth according to the invention is not critical, just as the pH-value in an aqueous medium is not critical, but the preferred range is 0.25 – 5.0 percent by weight of the total composition.

The following examples illustrate the invention; in examples 1–6 the figures given are percentages by weight.

1.) Mouth Wash

| | |
|---|---|
| Ethyl alcohol, 50% strength | 86.0 |
| Uracil-4-carboxylic acid | 1.0 |
| Glycine | 0.5 |
| Glycerol, 86% strength | 8.5 |
| Aroma substances | 3.0 |
| Sodium saccharin | 0.1 |
| n-Propyl-p-hydroxybenzoate | 0.1 |
| Sodium lauryl-sulphate | 0.8 |

2.) Toothpaste-

| | |
|---|---|
| Calcium pyrophosphate | 40.0 |
| Glycerol, 86% strength | 10.0 |
| Sorbitol, 60% strength | 10.0 |

| | |
|---|---|
| Carboxymethylcellulose | 1.5 |
| Methyl-p-hydroxybenzoate | 0.2 |
| Uracil-4-carboxylic acid | 2.0 |
| Lysine | 1.0 |
| Glycine | 0.5 |
| Aroma substances | 1.0 |
| Sodium saccharin | 0.1 |
| Lauryldimethylamine oxide | 1.5 |
| Water | 32.2 |

3.) Toothpaste

| | |
|---|---|
| Dicalcium phosphate dihydrate | 30.0 |
| Polyvinyl chloride powder | 10.0 |
| Polyacrylic acid, sodium salt | 2.0 |
| Sodium monofluorophosphate | 1.0 |
| Sodium lauryl-sulphate | 1.5 |
| Uracil-4-carboxylic acid | 1.5 |
| Methylglucamine | 1.5 |
| Sorbitol, 60% strength | 10.0 |
| Glycerol, 86% strength | 15.0 |
| Aroma and flavoring substances | 1.5 |
| Sodium saccharin | 0.1 |
| Sodium dihydrogen phosphate | 3.7 |
| Hexachlorophene | 0.2 |
| Water | 22.0 |

4.) Tooth Powder

| | |
|---|---|
| Dicalcium phosphate dihydrate | 55.0 |
| Dicalcium phosphate (anhydrous) | 15.0 |
| Cured melamine-formaldehyde condensation product | 15.0 |
| Water-insoluble sodium metaphosphate | 7.5 |
| Sodium lauryl-sulphate | 2.0 |
| Uracil-4-carboxylic acid | 2.0 |
| Pancreatin | 1.5 |
| Flavoring and aroma substances | 1.8 |
| Sodium saccharin | 0.2 |

5.) Toothpaste in Gel form

| | |
|---|---|
| Silicon dioxide gel ("Syloid"63 of Grace GmbH, particle size 10micron, surface area 830 cm²/g) | 15.0 |
| Silicon dioxid gel ("Syloid"72 of Grace GmbH, particle size 3micron, surface area 370 cm²/g) | 10.0 |
| Sorbitol, 60% strength | 8.0 |
| Glycerol, 86% strength | 22.0 |
| Carboxymethylcellulose | 1.5 |
| Uracil-4-carboxylic acid | 2.0 |
| Glycine | 1.0 |
| Sodium N-lauroylsarcoside | 1.5 |
| Hexachlorophene | 0.1 |
| Sodium saccharin | 0.1 |
| Flavoring and aroma substances | 1.3 |
| Water | 37.5 |

6.) Mouth Wash

| | |
|---|---|
| Ethanol, 50% strength | 80.0 |
| Uracil-4-carboxylic acid | 2.0 |
| Glycine | 1.0 |
| Glycerol, 86% strength | 9.0 |
| Aluminum lactate | 2.0 |
| Hexachlorophene | 0.05 |
| Sodium saccharin | 0.1 |
| Polyethylene oxide (molecular weight 400) | 1.0 |
| Aroma substances | 2.5 |
| 1-Hydroxyethane-1,1-diphosphonic acid | 2.35 |

7.) Chewing Gum 3.0 parts by weight of uracil-4-carboxylic acid, 2.0 parts by weight of pancreatin and 2.0 parts by weight of aluminum fluoride are added, per 100 parts by weight of the total composition, to a gum base composition containing the customary flavoring and aroma substances, and the composition is thoroughly mixed, rolled out and cut into strips.

We claim:

1. A dentrifice preparation for use in the care of the mouth containing a dentally acceptable carrier and an active agent in an amount sufficient to exert a vessel-activating blood perfusion promoting action on the gum, said active agent being orotic acid.

2. The dentifrice preparation of claim 1 wherein the orotic acid is present in an amount of from 0.25–5 percent by weight.

3. A method for exerting a vessel-activating blood perfusion promoting action on the gum in the mouth comprising contacting the gum with a dentifrice preparation containing a dentally acceptable carrier and an active agent in an amount sufficient to exert a vessel-activating blood perfusion promoting action on the gum, said active agent being orotic acid.

* * * * *